United States Patent Office 3,560,498
Patented Feb. 2, 1971

3,560,498
TETRASUBSTITUTED PYRIDAZINES
Donald E. Bublitz, Concord, Calif., and Raymond H. Rigterink, Midland, Mich., assignors to The Dow Chemical Company, Midland, Mich.
No Drawing. Filed Aug. 14, 1968, Ser. No. 752,720
Int. Cl. C07d 51/76
U.S. Cl. 260—250                    10 Claims

ABSTRACT OF THE DISCLOSURE

Tetra(methylthio)pyridazine and tetra(phenylthio)pyridazine and the tetrasubstituted pyridazines in which from one to three of the substituents are methylthio, ethylthio, methoxy, or ethoxy and the remaining substituents are chloro. These compounds are useful as pesticides.

---

The present invention relates to novel and useful tetrasubstituted pyridazine compounds which are representable by Formula I:

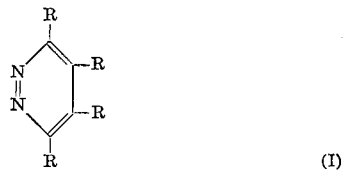

(I)

In the above and succeeding formulas, the R groups represent methylthio or phenylthio, or from one to three R groups represent methylthio, ethylthio, methoxy, or ethoxy and the remaining R groups represent chloro.

The products of the present invention are crystalline solids at room temperature. They are useful as pesticides for the control and kill of a wide variety of pests including insect, fungal, parasite, and plant pests. Examples of such pests are flies, roaches, beetles, worms, the causative agents of apple scab and potato late blight, and various terrestrial and aquatic weeds and plants. Representative tetrasubstituted pyridazines hereof include 3,4,6-trichloro-5-methylthiopyridazine,
4,5-dichloro-3,6-diethoxy-pyridazine
3,6-dichloro-4,5-di(ethylthio)pyridazine,
3,4,5-trimethoxy-6-chloropyridazine,
4,5-di(methylthio)-3,6-dichloropyridazine,
4,5,6-tri(methylthio)-3-chloropyridazine,
3-chloro-4,5,6-tri(ethylthio)pyridazine,
3,4,6-trichloro-5-ethylthiopyridazine,
4,5-dichloro-3,6-dimethoxy-pyridazine,
3,4,6-trichloro-5-ethoxypyridazine, and
3-chloro-4,5,6-triethoxypyridazine.

The compounds of the present invention are prepared by reacting together tetrachloropyridazine of the Formula II:

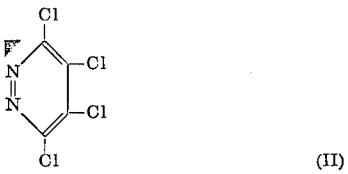

(II)

and an alkali metal compound of the Formula III:

R'—alkali metal                    (III)

In the above formula R' represents methylthio, ethylthio, methoxy, or ethoxy.

In the contacting and reacting of the designated reactants, some of any of the desired products is prepared by employing any molecular proportions. However, the reaction consumes the reactants in the ratio of one mole of tetrachloropyridazine per one, two, three, or four moles of the alkali metal compound depending upon whether it is desired to introduce one, two, three or four R' groups in the molecule and the employment of such amounts is preferred. A slight excess of the alkali metal compound often ensures complete reaction and can be employed without detriment. Utilization of an excess of more than from 5 to 10 percent of the alkali metal compound is disadvantageous for the substitution of less than four R' groups into the molecule.

Conveniently, the reaction between the tetrachloropyridazine and alkali metal compound is carried out in an anhydrous liquid reaction medium which is inert to and does not compete with the reactants. Representative media for such purposes include methanol, ethanol, dimethylformamide, tetrahydrofuran and the like. The reaction proceeds smoothly at the temperature range of from about 0° to about 100° C.

In carrying out the reaction, the tetrachloropyridazine, alkali metal compound, liquid reaction medium and catalyst, if employed, are mixed together in any convenient manner. In a preferred procedure, the alkali metal compound is added portionwise to the tetrachloropyridazine and catalyst, if employed, dispersed in a liquid reaction medium. The mixing and contacting of such reagents is carried out at a temperature of from 0° to 100° C. and preferably at a temperature of from about 0° to 20° C. for those products in which only one or two of the chlorine atoms are replaced by an R group and up to the boiling point of the mixture and under reflux for the products which will contain three or four R groups. Following the contacting of such reagents, the reaction mixture can be set aside for a period of time to ensure completion of the reaction. Upon completion of the reaction, the reaction mixture is conventionally processed to separate and isolate the desired products. Such include filtration, extraction, chromatography, and so forth.

Alternatively, in the preparation of the compounds containing three or four R groups, the alkali metal compound can be prepared in situ just prior to the addition of tetrachloropyridazine reactant. In such preparation, substantially equimolecular quantities of the alkali metal and the phenyl-, methyl-, or ethylmercaptan or methyl or ethyl alcohol are employed. The alkali metal and mercaptan or alcohol are contacted and maintained together in liquid reaction medium for a short period of time sufficient to prepare the alkali metal compound. Thereafter, the appropriate amount of tetrachloropyridazine is added to the resultant mixture.

Alternatively, the compounds of the present invention are prepared by reacting together tetrachloropyridazine of Formula II above and a reactant of the Formula IV:

R'—H                    (IV)

in the presence of tertiary amine. Suitable tertiary amines for this purpose include pyridine and the trialkylamines, trimethylamine, triethylamine, tributylamine and so forth.

In the contacting and reacting of the designated reactants, some of any of the desired products is prepared by employing any molecular proportions. However, the reaction consumes the reactants in the ratio of one mole of tetrachloropyridazine per one, two, three, or four moles of each of the R'–H compound and amine depending upon whether it is desired to introduce one, two, three or four R' groups in the molecule and the employment of such amounts is preferred. An excess of each of the R'–H compound and tertiary amine often ensures complete reaction and is conveniently employed. In carrying out this reaction, the conditions of reaction and procedural manner are analogous to that previously set forth.

The following examples serve further to typify the nature of the present invention and the manner by which it can be practiced but, as such, are not to be construed as limitations upon the overall scope hereof.

EXAMPLE 1

3,4,6-trichloro-5-methylthiopyridazine

Tetrachloropyridazine (5.0 grams; 0.023 mole) is dispersed in 200 milliliters absolute methanol. While vigorously stirring the resultant dispersion, there is added, dropwise, over a six hour period at 0° C. a solution of 1.6 grams (0.023 mole) sodium methylmercaptide in 100 milliliters absolute methanol. Following the addition, the reaction mixture is stirred at room temperature for ½ hour, after which time it is filtered. The filtrate is evaporated to dryness and the residue chromatographed on a column of activated alumina to obtain the 3,4,6-trichloro-5-methylthiopyridazine product as a solid melting at 55.5°–57.5° C.

Elemental analysis.—Calculated for $C_5H_3Cl_3N_2S$ (percent): C, 26.16; H, 1.32; N, 12.2. Found (percent): C, 26.1; H, 1.2; N, 12.3.

EXAMPLE 2

3,6-dichloro-4,5-di(methylthio)pyridazine

The reaction described in Example 1 is repeated in every detail except 3.2 grams (0.046 mole) of sodium methylmercaptide is employed to obtain the 3,6-dichloro-4,5-di(methylthio)pyridazine product as a solid melting at 118° C.

Elemental analysis.—Calculated for $C_6H_6Cl_2N_2S_2$ (percent): C, 29.88; H, 2.51; N, 11.62. Found (percent): C, 29.9; H, 2.5; N, 11.6.

EXAMPLE 3

3-chloro-4,5,6-tri(methylthio)pyridazine

To a stirred solution of 5.0 grams (0.023 mole) of tetrachloropyridazine and 20 milliliters (0.36 mole) of methyl mercaptan in 100 milliliters absolute methanol maintained at 0° C. is added, slowly, 20 milliliters of triethylamine. The reaction mixture is stirred at room temperature for 2 hours and then evaporated to dryness. The residue is extracted several times with hexane and the combined extracts evaporated to obtain the 3-chloro-4,5,6-tri(methylthio)pyridazine product as a solid melting at 69°–71° C.

Elemental analysis.—Calculated for $C_7H_9ClN_2S_3$ (percent): C, 33.26; H, 3.59; N, 11.08. Found (percent): C, 33.9; H, 3.8; N, 11.2.

EXAMPLE 4

3,4,5,6-tetra(methylthio)pyridazine

To a stirred suspension of 10.8 grams (0.05 mole) tetrachloropyridazine in 100 milliliters absolute methanol is added slowly at room temperature a solution of 17.5 grams (0.25 mole) of sodium methylmercaptide which is dispersed in 200 milliliters absolute methanol. The temperature of the reaction mixture is then raised to the boiling point with stirring and maintained under reflux for 2 hours. It is then cooled to room temperature and filtered. The filtrate is evaporated to dryness and the residue recrystallized from hexane to obtain the 3,4,5,6-tetra(methylthio)pyridazine product as a solid melting at 121° C.

Elemental analysis.—Calculated for $C_8H_{12}N_2S_4$ (percent): C, 36.33; H, 4.57; N, 10.59. Found (percent): C, 36.5; H, 4.5; N, 10.6.

EXAMPLE 5

3,4,5,6-tetra(phenylthio)pyridazine

Sodium (2.63 grams; 0.11 mole) is dispersed in 400 milliliters of absolute methanol. The resultant solution is added in one portion to 12.6 grams (0.11 mole) thiophenol. The resultant mixture is stirred for 10 minutes at room temperature and then combined with 5.0 grams (0.023 mole) of tetrachloropyridazine. The resultant mixture is heated to the boiling point and maintained under reflux with stirring for 2 hours, during which time an additional 400 milliliters methanol is added portionwise. The reaction mixture is then cooled and filtered. The filter cake is recrystallized from toluene to obtain 3,4,5,6-tetra(phenylthio)pyridazine product as a solid having a melting point of 204° C.

Elemental analysis.—Calculated for $C_{28}H_{20}N_2S_4$ (percent): C, 65.59; H, 3.93; N, 5.46. Found (percent): C, 65.9; H, 4.2; N, 5.6.

EXAMPLE 6

3-chloro-4,5,6-trimethoxypyridazine

To a stirred suspension of 10.8 grams (0.05 mole) of tetrachloropyridazine in 100 milliliters of absolute methanol is added slowly at 0° C. a solution containing 8.1 grams (0.15 mole) of sodium methoxide in 100 milliliters of methanol. The resultant reaction mixture is allowed to warm to room temperature and when attaining such is filtered. The filtrate is evaporated to dryness and the residue recrystallized from hexane to the 3-chloro-4,5,6-trimethoxypyridazine product as a solid melting at from 64.5° to 66.0° C.

Elemental analysis.—Calculated for $C_7H_9ClN_2O_3$ (percent): C, 41.09; H, 4.43. Found (percent): C, 41.2; H, 4.4

EXAMPLE 7

3,4,6-trichloro-5-methoxypyridazine

The reaction of Example 6 is repeated using 2.7 grams (0.05 mole) of sodium methoxide to obtain, after chromatographing the final residue on alumina, the 3,4,6-trichloro-5-methoxypyridazine product as a solid melting at from 47° to 48° C.

Elemental analysis.—Calculated for $C_5H_3Cl_3N_2O$ (percent): C, 28.14; H, 1.42; N, 13.12. Found (percent): C, 28.7; H, 1.5; N, 13.1.

EXAMPLE 8

3,4,6-trichloro-5-ethoxypyridazine

The procedure of Example 6 is repeated using 3.4 grams (0.05 mole) of potassium ethoxide to obtain, after chromatography of the final residue from alumina, the 3,5,6-trichloro-5-ethoxypyridazine product as a solid melting at from 147° to 152° C.

In procedures analogous to the foregoing and in accordance with the method of the present invention, the following compounds are prepared:

4,5-dichloro-3,6-diethoxy-pyridazine (melting at from 91°–93.5° C.) by reacting together tetrachloropyridazine and sodium ethoxide.

3,4,5 - triethylthio - 6 - chloropyridazine (molecular weight 294.9) by reacting together tetrachloropyridazine and potassium ethylmercaptide.

3,5,6-trichloro - 4-methoxypyridazine (molecular weight 271.3) by reacting together tetrachloropyridazine and lithium methoxide.

3,4,6 - trichloro - 5 - methylthiopyridazine (molecular weight 287.3) by reacting together tetrachloropyridazine and sodium methylmercaptide.

3 - ethoxy - 4,5,6 - trichloropyridazine (molecular weight 285.3) by reacting together tetrachloropyridazine and sodium ethoxide.

The compounds of the present invention are useful as pesticides for the control of a wide variety of household and agricultural pests such as flies, ticks, aphids, ascarids, pinworms, *Staphylococcus aureus, Bacillus subtilis*, pigweeds, and so forth. For such use, the unmodified compounds can be employed. Alternatively, the compounds can be dispersed in an edible solid to prepare animal feed compositions or on an inert finely divided solid to prepare dust compositions. The latter dust compositions can be dispersed in water with or without the aid of a wetting agent and the resulting aqueous dispersions employed as sprays.

In other procedures, the compounds can be employed as a constituent in solvent-in-water or water-in-solvent emulsions or dispersions which can be employed as sprays, drenches or washes. Good results are obtained when employing compositions containing pesticidal amounts, generally from 50 to 10,000 parts per million by weight, of one or more of the compounds.

In representative operations, 3 - chloro - 4,5,6 - trimethoxypyridazine gives 100 percent controls and kills of two-spotted spider mites when such are contacted with aqueous solutions containing the named compound as the sole toxicant at a concentration of 1000 parts per million by weight.

In further operations, 3,4,6 - trichloro - 5 - methylthiopyridazine, 3,4,6 - trichloro - 5 - methoxypyridazine, and tetra(methylthio)pyridazine each give 100 percent controls and kills of yellow fever mosquitoes when such are separately contacted with aqueous solutions containing one of the named compounds as the sole toxicant at a concentration of 25 parts per million parts by weight.

In additional operations, tetra(methylthio)pyridazine gives a substantially complete control and kill of pinworms when mice infested with pinworms are fed, as sole diet, feed compositions containing 0.10 percent by weight of the named compound.

In still further operations, each of 3,6 - dichloro-4,5-di(methylthio)pyridazine, 3,4,6 - trichloro - 5 - methylthiopyridazine, and 3,4,6-trichloro - 5 - methoxythiopyridazine give substantially complete controls and kills of each of the aquatic plant species Elodea, Cabomba, milfoil, and moneywort, when the named compounds are each separately dispersed in the water environment of each of the named plant species at a concentration of 25 parts per million by weight.

In additional operations, each of 3,6 - dichloro - 4,5-di (methylthio)pyridazine, 3,4,6 - trichloro - 5 - methylthiopyridazine, and 3,4,6 - trichloro - 5 - methoxypyridazine give a 100 percent control and kill of each of *Aspergillus terreus, Trichophyton mentagrophytes, Candida pelliculosa, Pullularia pullulans,* and bread mold fungus when such organisms are each separately contacted with compositions containing one of the named compounds at a concentration of 1000 parts per million by weight.

Tetrachloropyridazine can be prepared via a sequence of steps involving, first, reacting dichloromaleic anhydride with hydrazine to form the 1,2 - dihydro - 4,5 - dihalopyridazine - 3,6 - dione. This derivative is then reacted with halogenating agent, such as phosphorus oxytrichloride, to give the tetrachloropyridazine product.

What is claimed is:

1. The compound corresponding to the formula

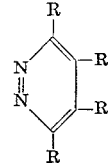

wherein the R groups represent methylthio or phenylthio, or from one to three R groups represent methylthio, ethylthio, methoxy, or ethoxy and the remaining R groups represent chloro.

2. The compound claimed in claim 1 which is 3,4,5-trichloro-5-methylthiopyridazine.

3. The compound claimed in claim 1 which is 3,6-dichloro-4,5-di(methylthio)pyridazine.

4. The compound claimed in claim 1 which is 3-chloro-4,5,6-tri(methylthio)pyridazine.

5. The compound claimed in claim 1 which is 3,4,6-trichloro-5-methoxypyridazine.

6. The compound claimed in claim 1 which is 3-chloro-4,5,6-trimethoxypyridazine.

7. The compound claimed in claim 1 which is 3,4,6-trichloro-5-ethoxypyridazine.

8. The compound claimed in claim 1 which is 4,5-dichloro-3,6-diethoxypyridazine.

9. The compound claimed in claim 1 which is tetra(methylthio)pyridazine.

10. The compound claimed in claim 1 which is tetra(phenylthio)pyridazine.

References Cited

UNITED STATES PATENTS

| | | | |
|---|---|---|---|
| 3,452,016 | 6/1969 | Horne | 260—250 |
| 2,905,672 | 9/1959 | Steck | 260—250 |
| 3,089,809 | 5/1963 | Kinugawa et al. | 260—250 |
| 3,169,848 | 2/1965 | Gysin et al. | 260—250 |

NICHOLAS S. RIZZO, Primary Examiner

U.S. Cl. X.R.

424—250

Notice of Adverse Decision in Interference

In Interference No. 98,006 involving Patent No. 3,560,498, D. E. Bublitz and R. H. Rigterink, TETRASUBSTITUTED PYRIDAZINES, final judgment adverse to the patentees was rendered Jan. 8, 1974, as to claims 5 and 7.

[*Official Gazette May 21, 1974.*]

Disclaimer 3,560,498.—*Donald E. Bublitz*, Concord, Calif. and *Raymond H. Rigterink*, Midland, Mich. TETRASUBSTITUTED PYRIDAZINES. Patent dated Feb. 2, 1971. Disclaimer filed Oct. 23, 1973, by the assignee, *The Dow Chemical Company*.

Hereby enters this disclaimer to claims 1, 5 and 7 of said patent.

[*Official Gazette April 22, 1975.*]